United States Patent [19]

Fage

[11] Patent Number: 5,211,008
[45] Date of Patent: May 18, 1993

[54] GAS EJECTION NOZZLE FOR A JET ENGINE AND A JET ENGINE FITTED WITH THIS NOZZLE, IN PARTICULAR AN ENGINE OF THE SEPARATE FLOW TYPE

[75] Inventor: Etienne Fage, Ramatuelle, France

[73] Assignee: Conception Aeronautique du Sud Ouest, Blagnac, France

[21] Appl. No.: 798,807

[22] Filed: Nov. 27, 1991

[30] Foreign Application Priority Data

Nov. 28, 1990 [FR] France .............................. 90 14984

[51] Int. Cl.$^5$ ............................................. F02K 1/09
[52] U.S. Cl. ............................. 60/226.2; 239/265.19; 60/271
[58] Field of Search ...................... 60/226.2, 271; 239/265.19, 265.31, 265.33, 265.43; 244/110 B

[56] References Cited

U.S. PATENT DOCUMENTS

| | | | |
|---|---|---|---|
| 2,408,099 | 9/1946 | Sherman | 239/265.19 |
| 2,570,629 | 10/1951 | Anxionnaz et al. | |
| 3,138,921 | 6/1964 | Prince | |
| 3,685,738 | 8/1972 | Leibach et al. | 239/265.19 |
| 3,797,785 | 3/1974 | Baerresen et al. | 239/265.31 |
| 3,829,020 | 8/1974 | Stearns | 239/265.29 |
| 3,897,001 | 7/1975 | Mason et al. | 60/226.2 |
| 4,383,407 | 5/1983 | Inman | 239/265.33 |
| 4,807,434 | 2/1989 | Jurich | 60/226.2 |

FOREIGN PATENT DOCUMENTS

| | | |
|---|---|---|
| 1458200 | 10/1966 | France . |
| 2349738 | 11/1977 | France . |
| 1035146 | 7/1966 | United Kingdom . |
| 1119608 | 7/1968 | United Kingdom . |
| 1199001 | 7/1970 | United Kingdom . |
| 2009063 | 6/1974 | United Kingdom . |

Primary Examiner—Louis J. Casaregola
Attorney, Agent, or Firm—William R. Hinds

[57] ABSTRACT

The invention relates to an ejection nozzle with a variable outlet section for a jet engine. An axially moving annular skirt (4) is disposed about the fixed nozzle wall (2) so that it can be displaced axially between an upstream position in which the skirt is disposed retracted about the fixed wall (2) and a downstream position in which it projects to the rear of the outlet section of this wall. A semiflexible crown (8) is provided to ensure the connection between the moving skirt (4) and the fixed wall (2), this crown bearing elastically about the wall (2). The invention makes it possible in particular to increase the outlet section of a central hot gas nozzle so as to ensure a reduction of the hot jet thrust when the thrust reversers are applied on the cold jet. It also makes it possible in certain flight conditions, especially during take-off in hot weather, to reduce the temperature of the hot outlet gases and thus to increase the speed of the gas generator and increase the direct jet thrust.

11 Claims, 8 Drawing Sheets

GAS EJECTION NOZZLE FOR A JET ENGINE AND A JET ENGINE FITTED WITH THIS NOZZLE, IN PARTICULAR AN ENGINE OF THE SEPARATE FLOW TYPE

The invention relates to an ejection nozzle with a variable outlet section for a jet engine. It relates in particular to a central hot gas ejection nozzle designed for use with a separate flow jet engine whose peripheral cold gas ejection nozzle is provided with a thrust reversal device. The invention also relates to jet engines fitted with this nozzle.

It is known that in order to shorten the stopping distance of a jet aircraft or to increase braking safety on wet or icy runways, the jets of the aircraft are currently fitted with a thrust reversal device which reverses the jet and produces a braking counter-thrust.

In the case of a separate flow jet engine this thrust reversal device is installed on the peripheral cold gas ejection nozzle as it has proved impracticable to maintain this device in operation in the central hot gas ejection nozzle as a result of the high temperature of the flow passing through it. In these conditions, the thrust reversal affects only the cold flow and the overall counter-thrust obtained (difference between the counter-thrust generated by the cold flow and the direct thrust generated by the hot flow) is low, generally some 15 to 20% of the total direct jet thrust.

In hot weather, the speed of the hot gas generator is limited by the maximum admissible temperature of the gases and the engine must be operated at reduced speed in order to avoid excess temperatures; this causes a substantial reduction of the thrust which is a major drawback during take-off.

U.S. Pat. Nos. 3,797,785 and 3,829,020 disclose a mixed flow jet engine nozzle which comprises, in the prolongation of the fixed nozzle wall, a moving jacket which may be retracted opposite the central body to increase the outlet section; during landing, the displacement of this jacket activates the thrust reversers. A device of this type which comprises mechanical members immersed in the flow is admissible for a mixed flow nozzle where the temperatures are relatively moderate but is not admissible for a central nozzle of a separate flow jet engine as a result, as mentioned above, of the high temperatures at the centre of the hot flow. Moreover, the device disclosed in this Patent introduces discontinuities into the inner nozzle wall which are prejudicial to performance in direct jet operation and entail the risk of gas leakages. Moreover, a device of this type cannot be used when there is no central jet engine body extending beyond the nozzle outlet.

U.S. Pat. Nos. 4,807,434 and French patent 2,349,738 also disclose thrust reversal systems disposed on the peripheral cold gas ejection nozzle of a separate flow jet engine. These systems comprise a portion which can be moved in axial translation which is associated with the thrust reversers or acts as a thrust reverser in the downstream position. For the reasons mentioned above, however, these systems cannot be transposed to a central hot flow ejection nozzle of a separate flow jet engine.

French Patent Specification 1,458,200 discloses, moreover, a nozzle with a central body which comprises a cylindrical rear skirt which can be moved axially opposite the central body so as to vary the section. However, a device of this type is applicable only in the case of nozzles with a central body.

The present invention proposes to remedy the shortcomings of the known devices and to provide a new ejection nozzle for use with a jet engine and enabling a variation of the gas outlet section. The invention is designed in particular to allow an increase in the outlet section of a central hot gas nozzle while remedying all the known problems arising from the risks of leakages or the high temperatures at the centre of these gases.

An object of the invention is therefore, in a separate flow jet engine, to provide for a reduction of the hot jet thrust when the thrust reversers are applied to the cold jet so as to achieve an overall counter-thrust which is much higher than in known separate flow jet engines.

A further object of the invention is to allow the achievement of an increased direct jet thrust in certain flight conditions, particularly in hot weather during take-off.

A further object is to allow an increase of the outlet section both for jet engines provided with a central body which is extended at the location of the nozzle and projects therefrom and for engines without this projecting central body.

For this purpose, the ejection nozzle of the invention, of the type comprising a fixed wall whose inner jacket has a shape which converges towards the nozzle outlet, is characterized in that it comprises:

an axially movable annular skirt disposed about the inner jacket and comprising a cylindrical upstream portion guided by the fixed nozzle wall and a downstream portion whose shape converges towards the nozzle outlet, the end of this downstream portion having a diameter greater than that of the outlet section of the inner jacket, means for the axial displacement of the moving skirt, disposed about and externally to the inner jacket and adapted to allow this skirt to be moved in axial translation between an upstream position in which the skirt is fully retracted about the inner jacket and a downstream position in which the downstream end of the skirt is disposed to the rear of the outlet section of the inner jacket, and a semi-flexible crown connecting the moving skirt and the fixed inner jacket, this semi-flexible crown being connected to the skirt so as to be displaced therewith and bearing elastically about the inner jacket so as to remain in contact with the outer surface thereof during its displacement.

In the upstream position, therefore, the moving skirt and its displacement means, fully retracted about the inner jacket of the nozzle, completely respect the inner shape thereof and its continuity; the flow is not disturbed and no mechanical member is immersed therein with the result that the invention can be readily used with hot flow nozzles and in particular with the central nozzles of separate flow jet engines. The retraction of the skirt causing it to project to the rear and about the fixed inner jacket causes an increase of the gas outlet section and makes it possible to adapt the latter to the flight stage in question, i.e., as will be explained below, the thrust reversal stage where the increase in the section entails a reduction of the direct jet thrust at a given engine speed, or during the take-off phase, especially in hot weather, where the increase in the section entails a decrease in the temperature of the hot gases making it possible to increase the speed of the hot gas generator (until reaching a temperature close to the maximum admissible temperature) which provides for an instantaneous increase of the thrust. The semi-flexible crown which may in particular comprise a plurality of sectors fixed to the downstream end of the moving skirt ensures the continuity of the inner surface of the nozzle when the moving jacket comes into the downstream position. This arrangement is particularly advantageous when the increase of the section is designed to obtain an increase in direct jet thrust (take-off during hot weather) as it prevents losses due to a disturbance of the flow between the inner jacket outlet and the downstream end of the moving skirt.

In the case where the increase in the section is designed on the contrary to obtain a reduction of the hot gas thrust (thrust reversal phase in respect of the cold jet), disturbances introduced into the hot flow help to reduce the thrust generated thereby. According to a further characteristic feature of the invention, the inner jacket of the nozzle may then comprise escape ports and means for closing these ports; these means are arranged to uncover the ports when the moving skirt reaches a predetermined downstream position corresponding to the thrust reversal position.

Consequently, according to an embodiment making it possible to optimize the various operating modes, the moving skirt and its displacement means are adapted so that three positions can be assigned to the skirt:

an upstream position, called cruising position, in which the skirt is disposed fully retracted about the inner jacket;

an intermediate downstream position, called direct jet position, in which the skirt projects to the rear of the inner jacket and causes an increase of the outlet section of between 5% and 15%, the escape ports remaining fully closed by the closure means; and an end downstream position, called reversal position, in which the skirt is disposed to the rear of the previous position and causes an increase in the outlet section of between 8% and 20%, the escape ports being fully uncovered in this case.

The invention may be applied to nozzles having no central inner body: the increase of the outlet section is then due to the greater diameter of the downstream end of the moving skirt with respect to the outlet of the fixed jacket; in this case, the diameter of the downstream end of the skirt is made substantially larger than the diameter of the jacket outlet so as to ensure the desired increase in the section.

The invention may also be applied to nozzles containing a central body having a convergent portion disposed facing the fixed jacket outlet; the retraction of the moving skirt then entails an increase of the outlet section which is due, at least in part, to the narrowing of the central body. In this case the diameter of the downstream end of the moving skirt may be close to that of the fixed jacket outlet.

Further characteristic features, objects and advantages of the invention are set out in the following description made with reference to the accompanying drawings which show, by way of non-limiting example, an embodiment and a variant and in which.

The nozzle shown by way of example in FIGS. 1 to 7 is a central nozzle of a separate flow jet engine which is adapted to discharge hot gases to the rear of the jet engine. The engine is conventionally provided with a central body 1 which projects from the central nozzle by means of a convergent conical portion 1a and with a peripheral nozzle for the discharge of cold gases (not shown) provided with a thrust reversal system making it possible to reverse the jet so as to produce a braking counter-thrust.

The invention is essentially designed, on the one hand, to reduce the thrust of the hot gases discharged via the central nozzle in the thrust reversal phase and, on the other hand, to allow an increase of the total thrust of the hot and cold gases during take-off in hot weather.

Figure 1:
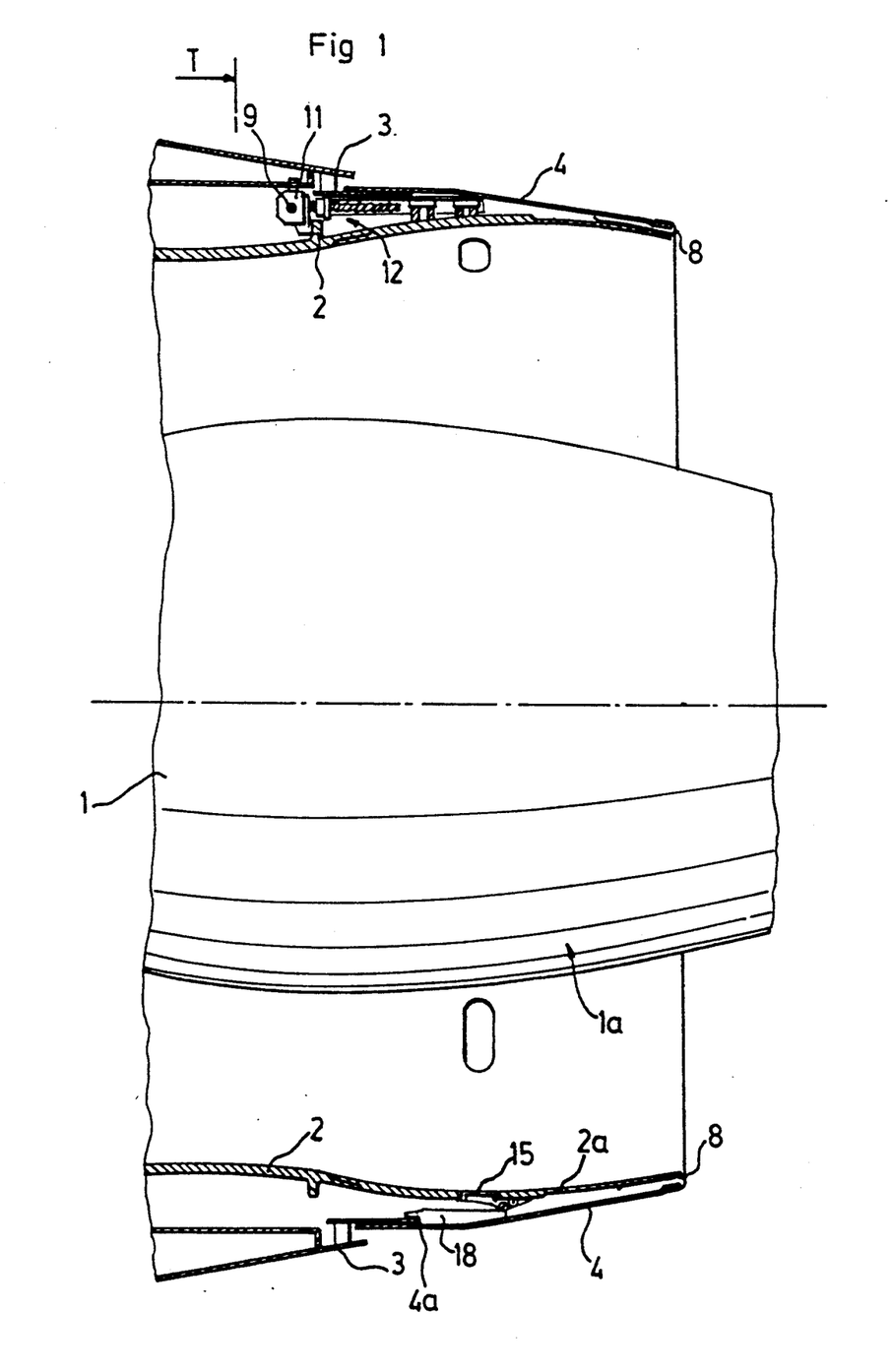
FIG. 1 is a partial diagrammatic section along two longitudinal planes PP' of a nozzle of the invention of the type with a long conical central body.

The periphery of the central nozzle is conventionally bounded by an annular fixed wall which is formed by an inner jacket 2 and an outer jacket 3 forming, together with the inner jacket, an annular casing in the upstream portion of the nozzle. The inner jacket 2 is extended by a rear portion 2a of a shape converging towards the nozzle outlet.

About the inner jacket 2, the nozzle is provided with an annular skirt 4 comprising a cylindrical upstream portion 4a and a conical downstream portion 4b converging towards the nozzle outlet. In its cylindrical upstream portion, this skirt of circular cross-section is guided by the fixed nozzle wall via guide systems distributed about the nozzle so that it can be moved in translation parallel to the longitudinal axis of the nozzle.

Figure 2:
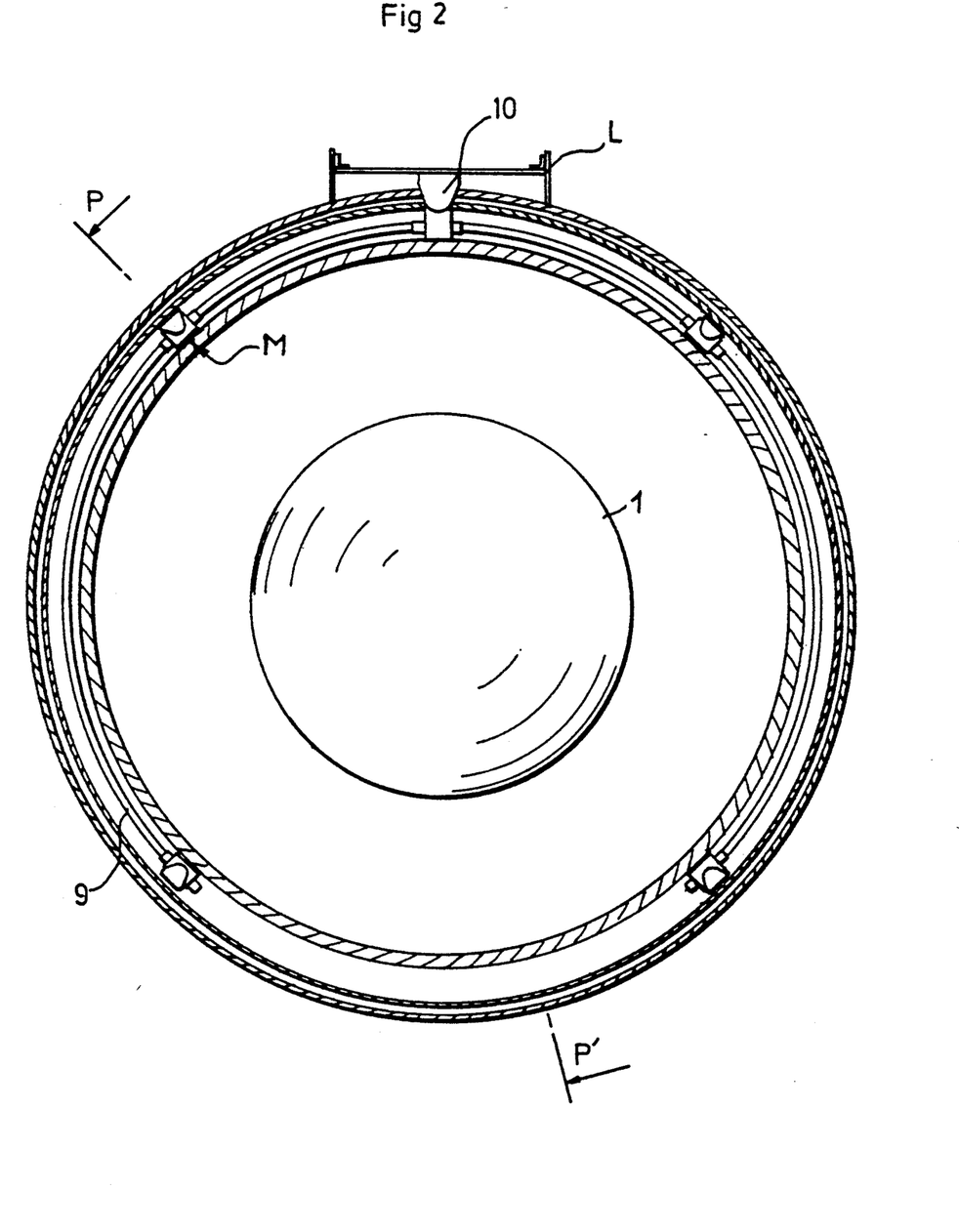
FIG. 2 is a cross-section through a plane T of FIG. 1.
Figure 3:
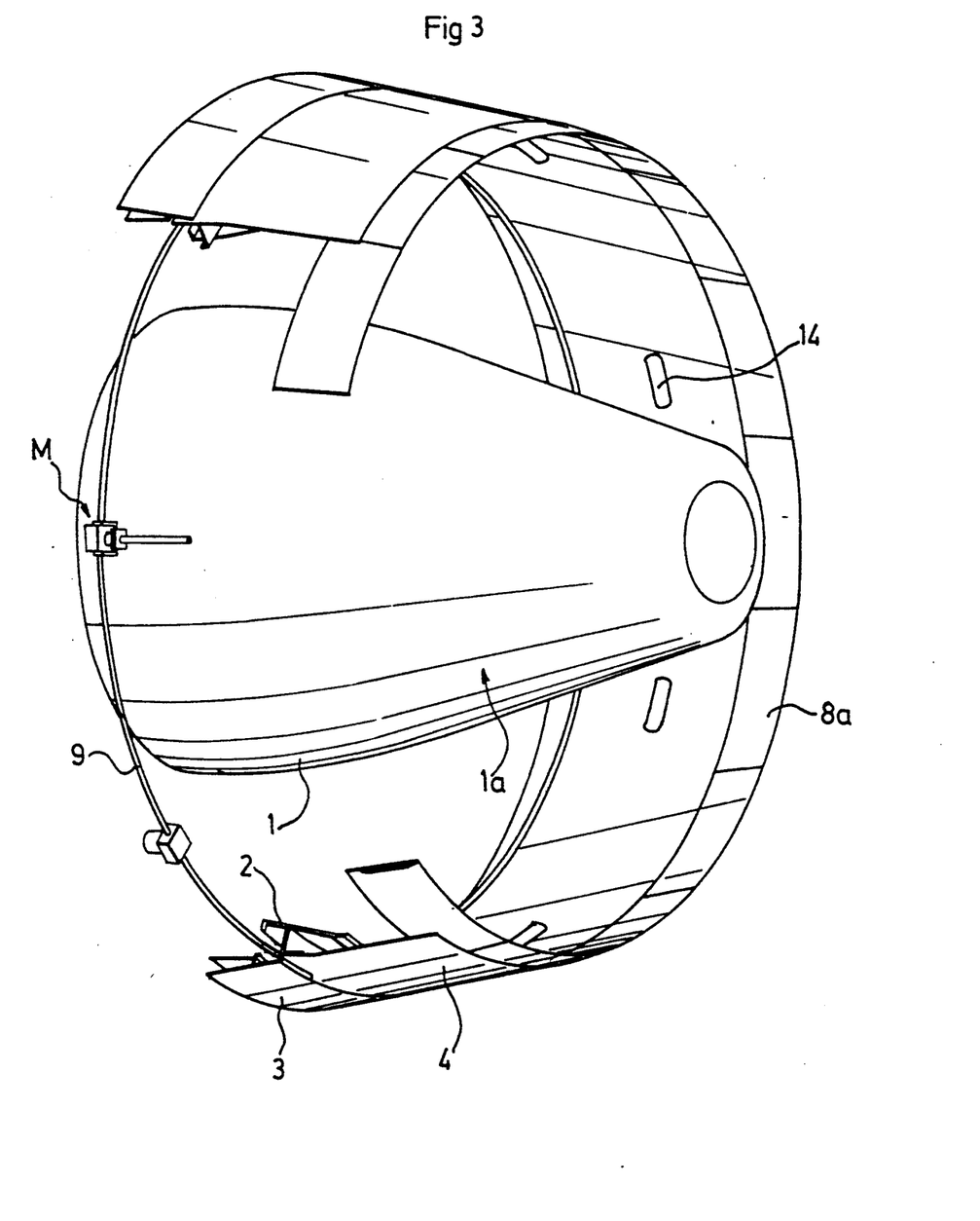
FIG. 3 is a diagrammatic perspective view with some parts of the nozzle removed.

Each guide system comprises, in the embodiment, rollers such as 5 disposed about the inner jacket and rigid therewith and a rail 6 rigid with the skirt 4; a plate 7 rigid with the skirt 4 is also guided by a cylindrical wall portion 3a which is associated with the outer jacket 3.

The end of the downstream portion 4b of the skirt has a slightly greater diameter than that of the outlet section of the inner jacket. A semi-flexible crown 8 comprising a plurality of sectors such as 8a is fixed to the end of the skirt in order to form a junction between this skirt and the inner jacket 2.

As a result of the elasticity of the material from which it is formed and its structure which is divided into sectors, this crown is adapted to come into resilient contact about the inner jacket 2 and to remain in contact with the outer surface thereof during the displacement of the skirt; in the embodiment, this crown has a curved upstream portion 8a followed by a divergent conical portion 8b.

Figures 7A, 7B:
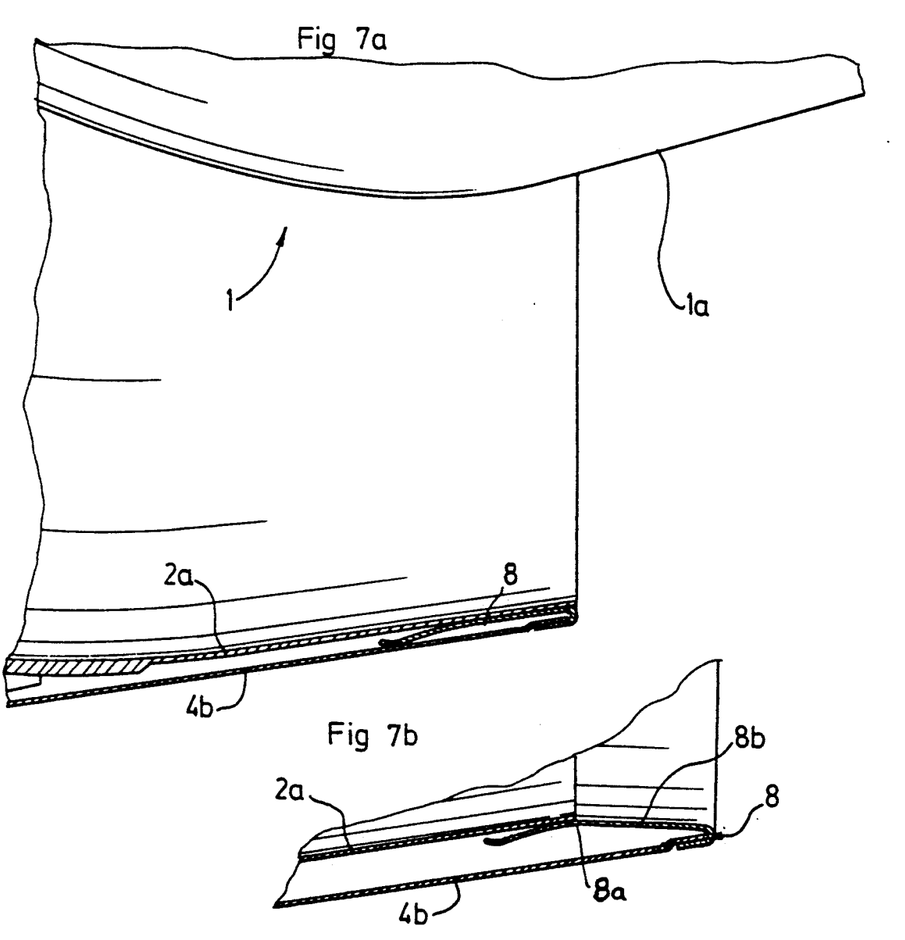
FIGS. 7a, 7b and 7c are partial sections showing the end of the nozzle in the three above-mentioned positions respectively.
Figure 7C:
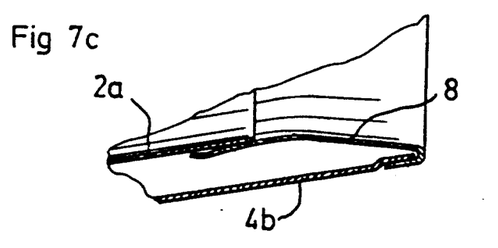

The moving skirt 4 and its semi-flexible crown 8 may thus adopt the positions shown diagrammatically in FIGS. 7a, 7b and 7c:

an upstream position in which the rear end of the skirt 4 is disposed retracted about the inner jacket 2 in the vicinity of its outlet section, the semi-flexible crown 8 being compressed between the skirt and the inner jacket (FIG. 7a);

an intermediate downstream position in which the curved portion 8a of the crown is substantially at the location of the outlet section of the inner jacket (FIG. 7b); and an end downstream position corresponding to the maximum retraction of the skirt 4 and the semi-flexible crown 8.

The displacement of the skirt 4 is ensured by a rotary hose 9 which is disposed about the inner jacket 2 in the casing which this jacket forms with the outer jacket 3. This hose is driven in rotation by a geared motor unit 10 which is disposed in the top portion of the nozzle and may for instance be fixed to the lower spar L of the jet engine strut.

A plurality of endless screw mechanisms such as M are distributed along the rotary hose 9 so as to provide for the driving of the skirt 4.

Figures 4, 5A:
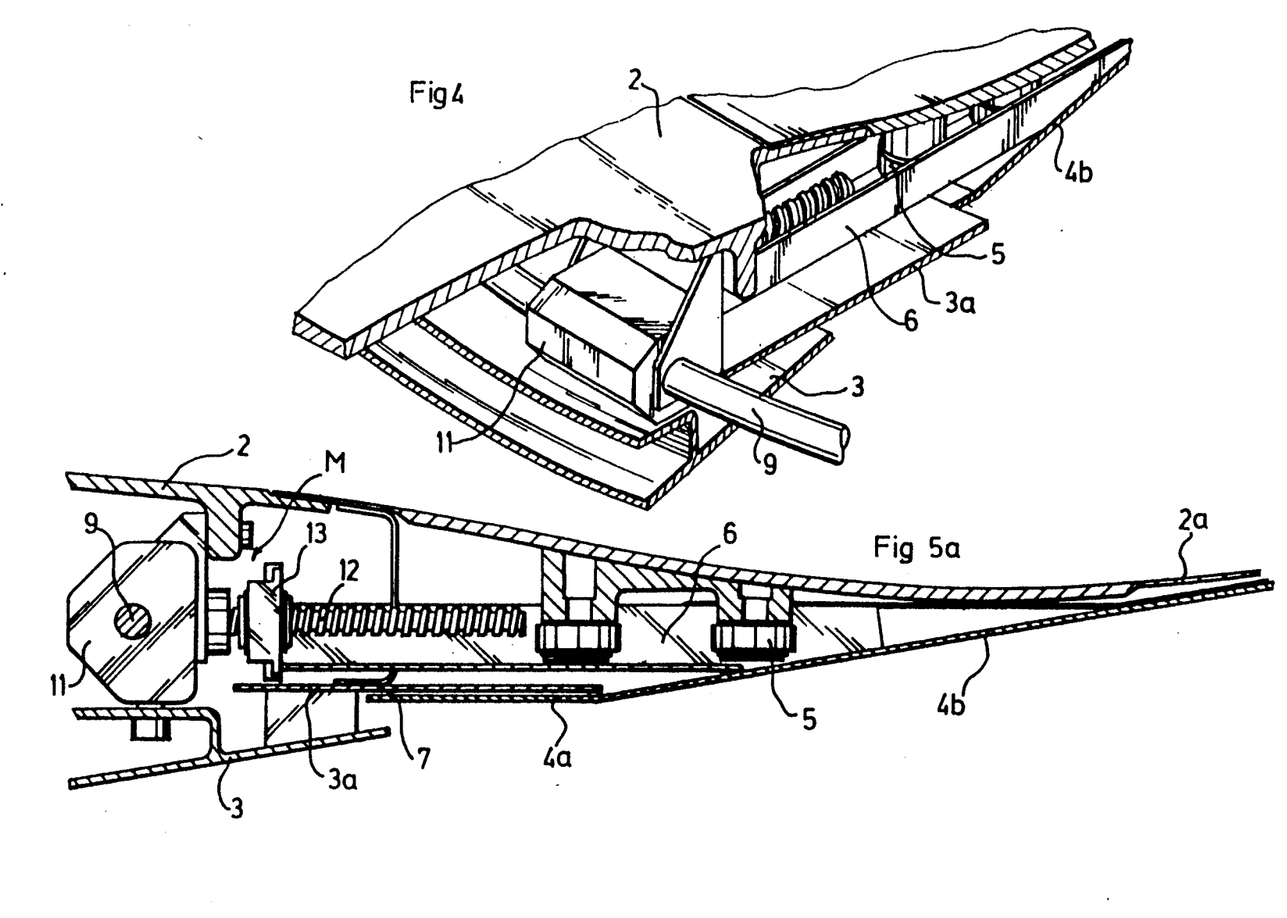
FIG. 4 is a perspective view of a detail showing one of the endless screw drive mechanisms.
FIGS. 5a, 5b and 5c are cross-sections through details showing this drive mechanism in the upstream cruising position, in the intermediate downstream position, called the direct jet position, and in the end downstream position or reversal position respectively.
Figure 5B:
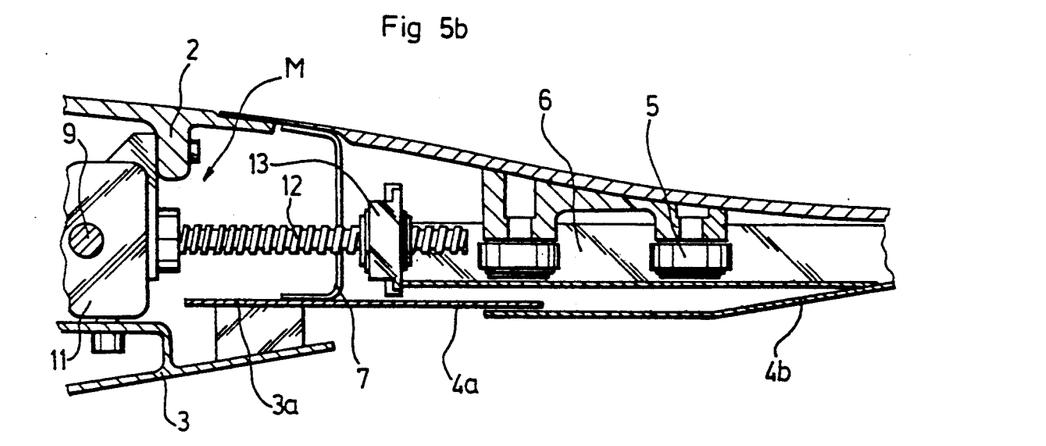
Figure 5C:
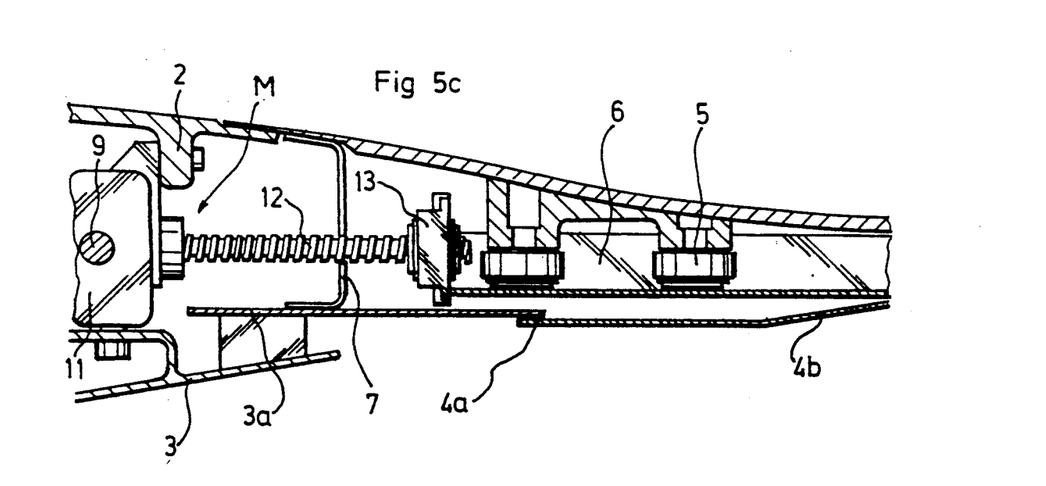

Each mechanism is identical to the one shown in detail in FIGS. 5a, 5b and 5c. Each mechanism comprises a housing 11 secured in the casing and containing the conventional mechanical members in connection with the hose 9, an endless screw 12 and a moving outlet bolt 13 rigid with the skirt 4 so as to drive the latter in axial translation under the effect of the rotation of the endless screws 12 resulting from the rotation of the hose 9.

Moreover, at angular positions offset with respect to the positions of the drive mechanisms M, escape ports such as 14 are provided in the inner jacket 2. Closure means are associated with these ports so as to close them and open them when the moving skirt 4 reaches the end downstream position.

Figure 6A:
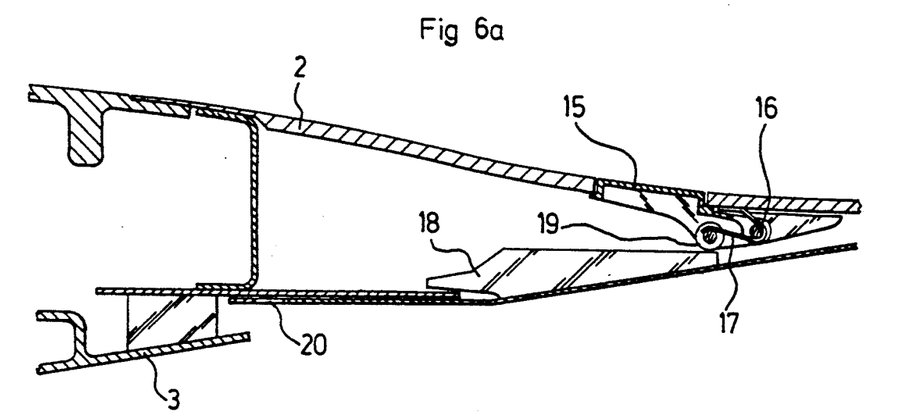
FIGS. 6a, 6b and 6c are cross-sections through details showing one of the closure valves in the three above-mentioned positions respectively.
Figure 6B:
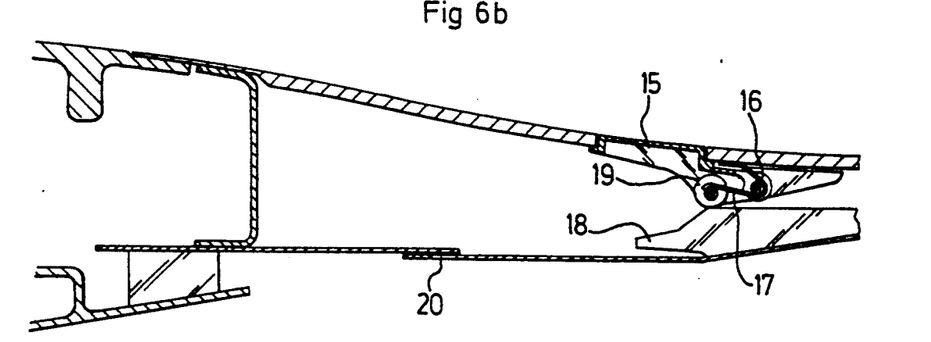
Figure 6C:
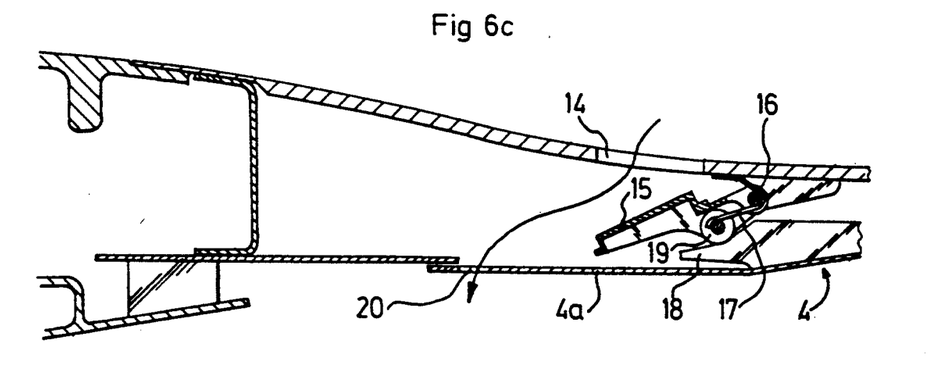

These closure means are shown in detail in FIGS. 6a, 6b and 6c respectively in the upstream cruising position, the intermediate downstream position (direct jet position) and the end downstream position (thrust reversal position).

Each port 14 is associated with a pivoting leak-tight valve 15 which is borne by a spindle 16 and is urged towards its closed position by elastic means such as springs 17. A cam 18 forming a raceway for a roller 19 rigid with the valve ensures the opening of the valve during the retraction of the skirt 4 when the latter reaches the end downstream position. Moreover, openings 20 provided to the rear of the skirt are then uncovered so as to create a gas escape to atmosphere.

During normal flight (cruising position corresponding to FIGS. 5a, 6a and 7a) the skirt 8 is entirely retracted about the inner jacket 2. The inner surface of the jacket is continuous and no member is immersed in the hot flow. The nozzle behaves as a conventional nozzle with a given working outlet section (difference between the section of the inner jacket and the section of the central body).

Figure 8A:
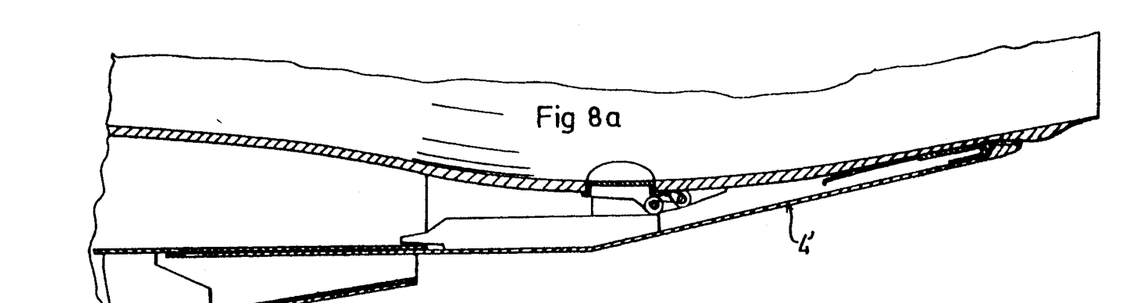
FIGS. 8a, 8b and 8c show a nozzle variant in partial longitudinal section in the three above-mentioned positions respectively.
Figure 8B:
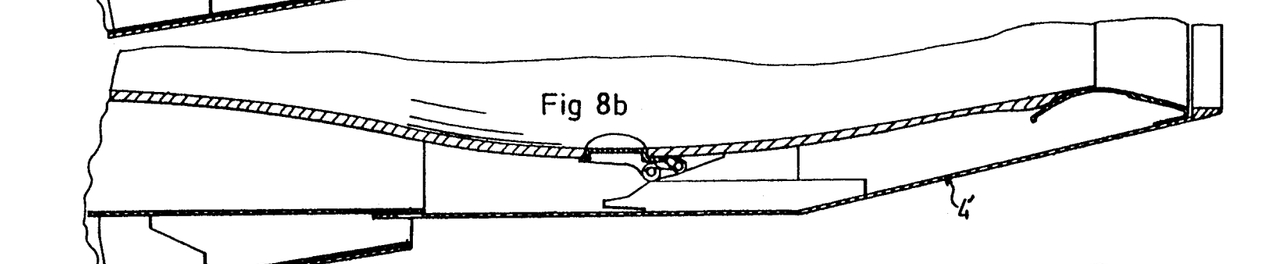

During take-off in hot weather the pilot may control the retraction of the skirt so as to dispose it in an intermediate downstream position (FIGS. 6b, 7b, 8b). In this position the nozzle is extended and its outlet section is increased as a result, on the one hand, of the greater diameter of the rear end of the skirt 8 and, on the other hand, of the narrowing of the central body. In practice, an increase in section of between 5 and 15%, in particular of some 10%, leads to a decrease in the hot gas temperature at a given speed; as this temperature is the limiting factor during this flight stage, the pilot may thus increase the engine speed to re-establish the temperature and obtain an increase of some 5% in the total thrust. It should be noted that in this position the inner surface of the nozzle remains continuous up to the outlet section.

During thrust reversal, the activation by the pilot of the thrust reversers of the peripheral nozzle causes the skirt 4 to retract to its end downstream position. It should be noted that this retraction is controlled by these thrust reversers so that it is prevented during direct jet operation. The outlet increase, in particular of between 8 and 20%, and especially of some 12%, causes, at constant engine speed (constant flow), a reduction of the temperature of the hot gases and their outlet speed and consequently a reduction of the direct thrust. Moreover, the ports 14 and openings 20 are then uncovered and this disturbance of the flow further reduces the hot flow thrust.

It is thus possible substantially to limit the effect of the hot gas thrust during the reversal phase so as to obtain a counter-thrust which is greatly improved with respect to that of known jet engines.

Figure 8C:
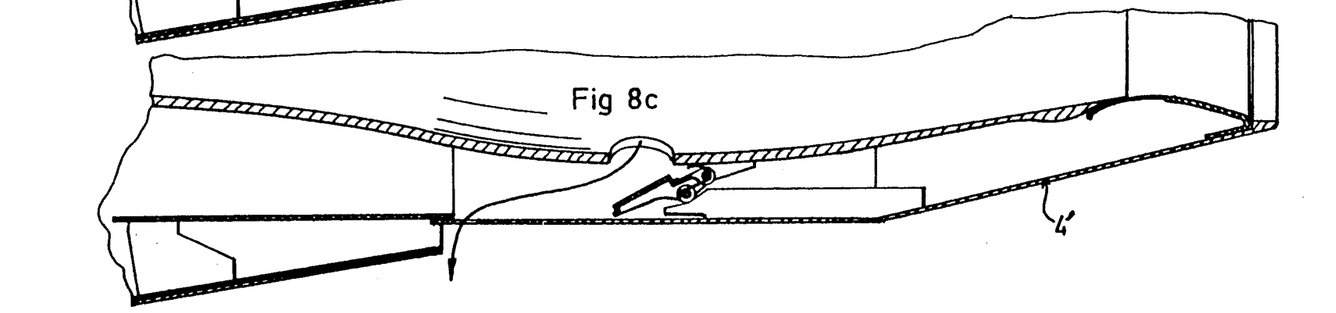

FIGS. 8a, 8b and 8c show a nozzle variant in the upstream position (cruising), in the intermediate downstream position (direct jet) and in the end downstream position (thrust reversal) respectively.

This variant is adapted for use with a jet engine with a short (non-projecting) central body. The various members of the nozzle are similar to those described above, but in this case the moving skirt 4' is shaped so that it has an end diameter which is much greater than the diameter of the section of the inner jacket; this skirt and its displacement means are disposed to allow a greater retraction about the inner jacket in the upstream position, as shown in FIG. 8a.

In this case the increase of the outlet section is due solely to the increased diameter of the end of the skirt both in the intermediate downstream position (FIG. 8b) and in the end downstream position (FIG. 8c). It may be some 5 to 15%.

I claim:

1. An ejection nozzle with a variable outlet section for a jet engine, of the type comprising a fixed wall having an inner jacket (2) whose shape converges towards the nozzle outlet, characterized in that it comprises:

an axially movable annular skirt (4) disposed about the inner jacket (2) and comprising a cylindrical upstream portion (4a) guided by the fixed nozzle wall and a downstream portion (4b) whose shape converges towards the nozzle outlet, the end of this downstream portion having a diameter greater than that of the outlet section of the inner jacket, means for guiding and axially displacing the moving skirt (5–7, 9–12), disposed about and externally to the inner jacket (2) and adapted to allow this skirt to be moved in axial translation between an upstream position in which the skirt is fully retracted about the inner jacket and a downstream position in which the downstream position of the skirt is disposed to the rear of the outlet section of the inner jacket, and a semi-flexible crown (8) connecting the moving skirt (4) and the fixed inner jacket (2), this semi-flexible crown being connected to the skirt so as to be displaced therewith and bearing elastically about the inner jacket so as to remain in contact with the outer surface thereof during its displacement.

2. An ejection nozzle as claimed in claim 1, characterized in that the semi-flexible crown (8) is formed by a plurality of sectors (8a) fixed to the downstream end of the moving skirt (4) about the latter.

3. An ejection nozzle as claimed in claim 1, in which the fixed wall comprises the above-mentioned inner jacket (2) and an outer jacket (3) forming, together with this inner jacket, an annular casing in the upstream nozzle portion, characterized in that the moving skirt (4) is guided by guide systems (5-7) distributed about the inner jacket and housed in the above-mentioned annular casing, the axial displacement means themselves being housed in this annular casing.

4. An ejection nozzle as claimed in claim 3, characterized in that the axial displacement means comprise a rotary hose (9) disposed about the inner jacket (2) in the above-mentioned casing, a geared motor unit (10) for driving the hose in rotation and a plurality of endless screw mechanisms (M) distributed along the rotary hose, each endless screw mechanism having a housing (11) secured in the casing and an endless screw (12) and a moving outlet bolt (13) rigid with the skirt (4) so as to drive the latter in axial translation under the action of the rotation of the hose.

5. A central hot gas ejection nozzle as claimed in claim 1, used with a separate flow jet engine so as to make it possible to control an increase of the hot gas outlet section.

6. A nozzle as claimed in claim 5, characterized in that the inner jacket (2) comprises escape ports (14) and closure means (15-19) for these ports arranged to uncover the ports when the moving skirt (4) reaches a predetermined downstream position.

7. An ejection nozzle as claimed in claim 6, characterized in that the closure means comprise pivoting leaktight valves (15), elastic means (17) maintaining each valve against an escape port (14) and a system of cams (18, 19) associated with the moving skirt and adapted to ensure the opening of the valves when the skirt reaches the above-mentioned downstream position.

8. An ejection nozzle as claimed in claim 6, characterized in that the rear portion of the moving skirt (4) comprises openings (20) adapted to be uncovered when the skirt reaches the above-mentioned downstream position so as to create a gas escape to atmosphere.

9. An ejection nozzle as claimed in claim 8, characterized in that the moving skirt (4) and the guide and axial displacement means are adapted so that three positions can be assigned to this moving skirt:
an upstream position, called cruising position, in which the skirt (4) is disposed retracted about the inner jacket (2);
an intermediate downstream position, called direct jet position, in which the skirt projects to the rear of the inner jacket and causes an increase of the outlet section of between 5% and 15%, the escape ports (14) remaining fully closed by the closure means, while the openings (20) of the skirt remain covered;
an end downstream position, called reversal position, in which the skirt is disposed to the rear of the previous position and causes an increase in the outlet section of between 8% and 20%, the escape ports (14) being fully uncovered and the openings (20) uncovered.

10. An ejection nozzle as claimed in claim 9, for use with a jet engine having a central body (1) extending along the axis of the nozzle, the outlet section of the nozzle being disposed facing a converging portion (1a) of the central body such that the retraction of the moving skirt (4) causes an increase in the outlet section due at least in part to the narrowing of the central body.

11. A central hot gas ejection nozzle as claimed in claim 5 used with a separate flow jet engine comprising a peripheral nozzle for the discharge of cold gases associated with a thrust reversal system.

* * * * *